United States Patent
Blachon et al.

(10) Patent No.: US 9,695,869 B2
(45) Date of Patent: Jul. 4, 2017

(54) SPHERICAL PLAIN BEARING WITH INNER SLEEVE

(71) Applicants: Yvan Blachon, Ponsas (FR); Arnaud Turmeau, Mallisard (FR)

(72) Inventors: Yvan Blachon, Ponsas (FR); Arnaud Turmeau, Mallisard (FR)

(73) Assignee: SKF AEROSPACE FRANCE S.A.S, Saint-Vallier (FR)

( * ) Notice: Subject to any disclaimer, the term of this patent is extended or adjusted under 35 U.S.C. 154(b) by 85 days.

(21) Appl. No.: 14/755,112

(22) Filed: Jun. 30, 2015

(65) Prior Publication Data

US 2016/0003293 A1 Jan. 7, 2016

(30) Foreign Application Priority Data

Jul. 1, 2014 (EP) .................................... 14175241

(51) Int. Cl.
| | | |
|---|---|---|
| F16C 25/04 | (2006.01) | |
| F16C 23/04 | (2006.01) | |
| F16C 11/06 | (2006.01) | |
| F16C 33/04 | (2006.01) | |
| F16C 33/08 | (2006.01) | |

(52) U.S. Cl.
CPC ........ *F16C 23/046* (2013.01); *F16C 11/0609* (2013.01); *F16C 11/0614* (2013.01); *F16C 33/043* (2013.01); *F16C 33/046* (2013.01); *F16C 33/08* (2013.01); *F16C 2204/00* (2013.01); *F16C 2204/10* (2013.01); *F16C 2223/42* (2013.01); *F16C 2223/60* (2013.01); *F16C 2240/60* (2013.01)

(58) Field of Classification Search
CPC .... F16C 23/043; F16C 23/045; F16C 23/046; F16C 23/048; F16C 2226/76
USPC ............................................. 384/212
See application file for complete search history.

(56) References Cited

U.S. PATENT DOCUMENTS

| | | | |
|---|---|---|---|
| 2,260,283 A | | 10/1941 | Halford et al. |
| 2,300,754 A | * | 11/1942 | Whiteley ............ F16C 23/045 384/413 |
| 3,888,554 A | | 6/1975 | McCloskey |
| 3,915,518 A | * | 10/1975 | McCloskey ........... F16C 23/045 384/212 |
| 4,077,681 A | * | 3/1978 | McCloskey ........... F16C 23/045 29/898.052 |

(Continued)

FOREIGN PATENT DOCUMENTS

| | | |
|---|---|---|
| EP | 1130276 A1 | 9/2001 |
| EP | 1431597 A1 | 6/2004 |
| JP | S5519804 U | 2/1980 |

*Primary Examiner* — Phillip A Johnson
(74) *Attorney, Agent, or Firm* — Bryan Peckjian; SKF USA Inc. Patent Dept.

(57) ABSTRACT

A spherical plain bearing comprising an inner ring provided with a spherical outer surface and with lateral surfaces, an outer ring provided with a corresponding spherical inner surface mounted on the outer surface, and a sleeve mounted into a bore of the inner ring. The inner ring comprises at least three part rings which are mounted in contact in the circumferential direction one relative to another. At least one protrusion is provided on an outer surface of the sleeve and extends into a groove formed on the bore of the inner ring. The sleeve leaves the lateral surfaces free of the inner ring.

20 Claims, 3 Drawing Sheets

(56) References Cited

U.S. PATENT DOCUMENTS

2004/0115040 A1\* 6/2004 Bathori .................. F01D 25/16
 415/106
2007/0189649 A1\* 8/2007 Montazeri ........... F16C 11/0614
 384/192

\* cited by examiner

SPHERICAL PLAIN BEARING WITH INNER SLEEVE

CROSS REFERENCE TO RELATED APPLICATIONS

This is a Non-Provisional Patent Application, filed under the Paris Convention, claiming the benefit of Europe Patent (EP) Application Number 14175241.0 filed on 1 Jul. 2014 (1 Jul. 2014), which is incorporated herein by reference in its entirety.

TECHNICAL FIELD OF THE INVENTION

The present invention relates to the field of spherical plain bearings, notably those used in the aeronautics industry.

BACKGROUND ART OF THE INVENTION

In the aeronautics industry, it is known to use a spherical plain bearing for preventing two members, such as a rod and a structural part, from moving axially relatively while allowing a relative rotational movement of the members.

Such bearing generally comprises an inner ring having a truncated spherical outer surface and an outer ring having a truncated spherical inner surface in contact with the outer surface. The inner and outer rings thus have three degrees of freedom in rotation, while being firmly fixed to each other in translation.

In order to obtain a light spherical plain bearing, it is known to form the inner ring from a metal or from a metal alloy having a low density, for example titanium, titanium alloys, aluminum and aluminum alloys. However, the frictional behavior of such metals and metal alloys is not compatible with the stresses applied in operation to the inner ring by the shaft onto which is mounted the bearing.

Accordingly, the spherical plain bearing may further comprise a sleeve mounted into the bore of the inner ring and made from a material having good friction properties as described for example in EP-B1-1 431 597. The disclosed sleeve comprises, at one end, a radial shoulder axially bearing against a frontal surface of the inner ring.

With such a sleeve, the angular slewing capacity of the spherical plain bearing is limited. Besides, it is necessary to foreseen additional axial retaining means to prevent relative axial movement between the sleeve and the inner ring.

BRIEF SUMMARY OF THE INVENTION

One aim of the present invention is to overcome these drawbacks.

In one embodiment, the spherical plain bearing comprises an inner ring provided with a spherical outer surface and with lateral surfaces, an outer ring provided with a corresponding spherical inner surface mounted on the outer surface, and a sleeve mounted into a bore of the inner ring. The inner ring comprises at least three part rings which are mounted in contact in the circumferential direction one relative to another. At least one protrusion is provided on an outer surface of the sleeve and extends into a groove formed on the bore of the inner ring. Alternatively or in combination, at least one protrusion is provided on the bore and extends into a groove formed on the outer surface. The sleeve leaves free the lateral surfaces of the inner ring.

With such design, the angular slewing capacity of the spherical plain bearing is increased since the sleeve does not cover the lateral surfaces of the inner ring. Besides, the protrusion provided on the sleeve, and/or on the inner ring, and the corresponding groove enable to achieve the axial retention of the sleeve relative to the inner ring without additional separate means.

Preferably, a radial gap is provided between the protrusion(s) and a bottom of the associated groove.

The protrusion(s) may extend radially. Preferably, the protrusion(s) comprise sloped frontal surfaces engaging with corresponding sloped sidewalls of the associated groove.

In one embodiment, only one protrusion is provided. The protrusion may be located in a radial plane passing through the centre of the sleeve and of the inner ring.

Preferably, at least one part ring of the inner ring comprises chamfers formed at least at one end of the bore of the part ring.

The part rings of the inner ring may be identical one to another. Alternatively, at least one of the part rings of the inner ring may have a reduced length in the circumferential direction with regard to the other part rings.

Advantageously, the inner ring is made from a material having a density smaller than the one of the material of the sleeve. The sleeve may be made from bronze and/or the inner ring may be made from titanium.

In one embodiment, at least one of the inner and outer surfaces of the rings is coated with an antifriction and/or wear resistance coating. In order to obtain both low friction and high wear resistance, the spherical inner surface of the outer ring may be coated with a physical vapor deposition coating such as a diamond like carbon (DLC) coating or a tungsten-DLC (WCC) coating. The thickness of the coating may be equal to 5 μm for example. The spherical outer surface of the inner ring may be coated with a thermal spray coating such as a copper-nickel-indium (CuNiJn) coating. The thickness of the coating may be equal to 150 μm for example.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE PRESENT INVENTION

Figure 1:
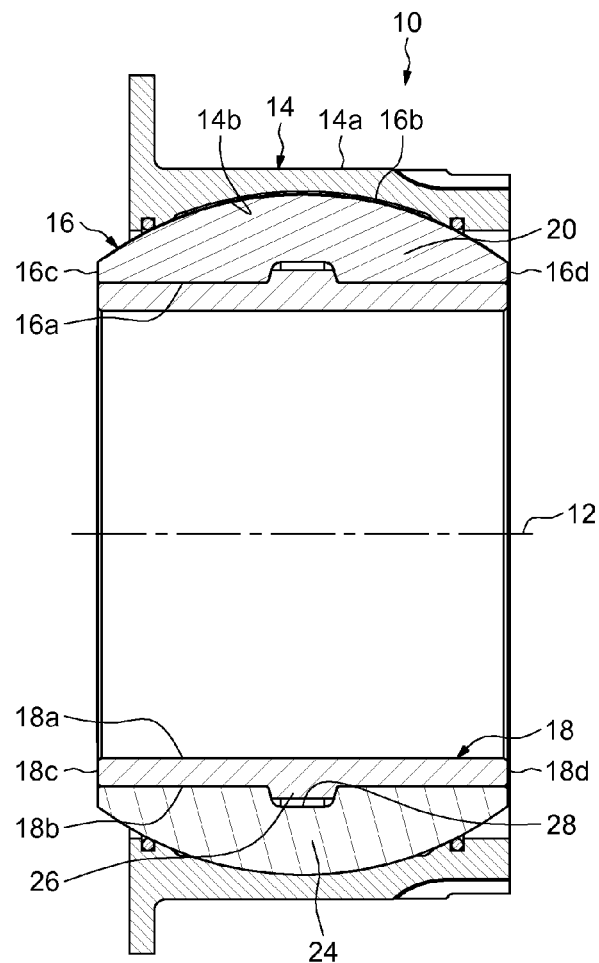
FIG. 1 is a cross-section of a spherical plain bearing according to a first example of the invention.
Figure 3:
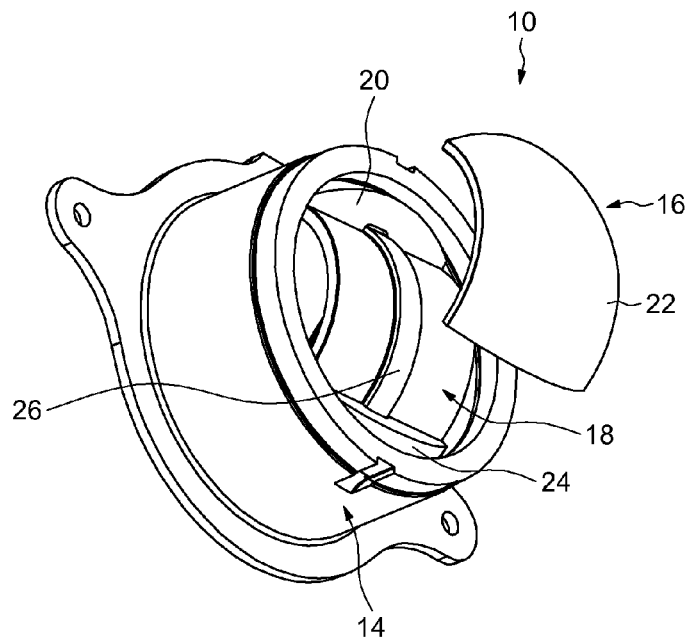
FIG. 3 is an exploded perspective view of the bearing of FIGS. 1 and 2.
Figure 4:
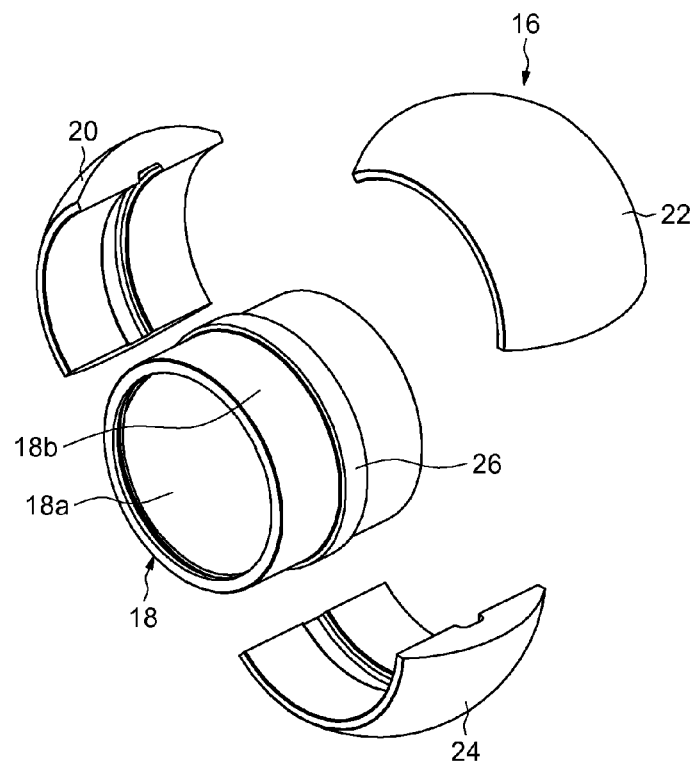
FIG. 4 is an exploded perspective view of an inner ring and a sleeve of the bearing of FIGS. 1 to 3.
Figure 5:
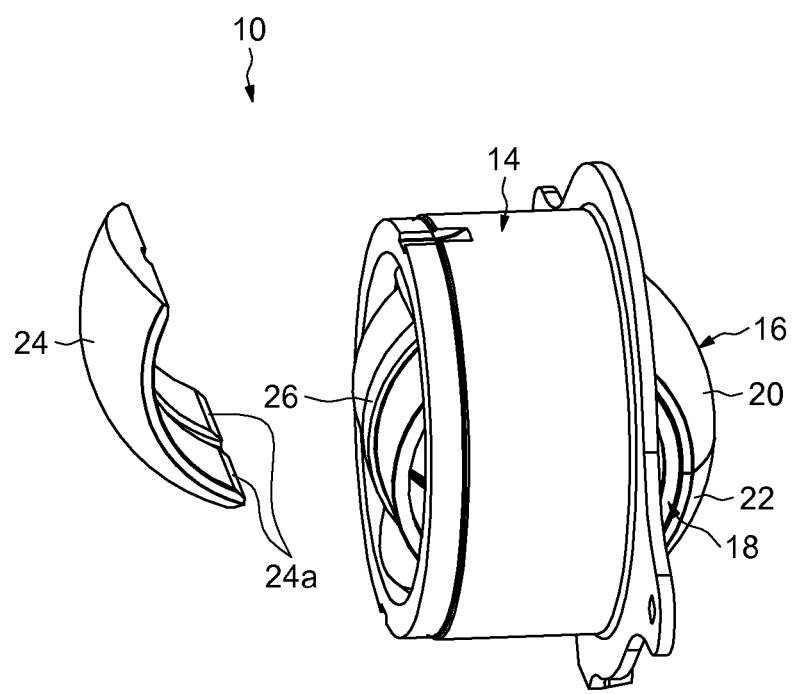
FIG. 5 is a cross-section of a spherical plain bearing according to a second example of the invention.

As illustrated on FIGS. 1, 3 and 4, a spherical plain bearing 10, with an axis 12, comprises an outer ring 14, an inner ring 16 onto which is mounted the outer ring, and an inner sleeve 18 mounted into a cylindrical bore 16a of the inner ring.

The outer ring 14 comprises an outer surface 14a, an opposite inner surface 14b having a spherical concave shape and opposite radial lateral (not referenced) which axially delimit the surfaces 14a, 14b. The inner ring 16 comprises the bore 16a and an outer surface 16b mounted in radial contact against the inner surface 14b of the inner ring and having a spherical complementary convex shape. The inner ring 16 further comprises two opposite radial lateral surfaces 16c, 16d which axially delimit the bore 16a and the outer surface 16b of the ring.

The inner ring 16 is formed by the assembling of three segments or part rings 20, 22, 24 which are mounted bearing against one another in the circumferential direction. The inner ring 16 is subdivided in the circumferential direction by the three distinct parts 20 to 24. Each part ring 20, 22, 24 bears circumferentially at each end with one of the other part. The outer surfaces of the part rings 20 to 24 form the spherical outer surface 16b of the inner ring. The inner surfaces of the part rings 20 to 24 form the bore 16a. Advantageously, the inner ring 16 is made from a material having a density smaller than the one of the material of the sleeve 18. The inner ring 16 may be made for example from titanium.

The sleeve 18, of tubular shape, is mounted in radial contact against the bore 16a of the inner ring. The sleeve 18 comprises a cylindrical bore 18a, an outer cylindrical surface 18b and two opposite radial lateral surfaces 18c, 18d which axially delimit the bore and the outer surface. The lateral surfaces 18c, 18d are respectively coplanar with the lateral frontal surfaces 16c, 16d of the inner ring. The sleeve 18 leaves free the lateral surfaces 16c, 16d of the inner ring. The lateral surfaces 16c, 16d are not covered by the sleeve 18. The sleeve 18 may be made from bronze.

The sleeve 18 further comprises an annular rib 26 extending radially from the outer surface 18b towards the inner ring 16. The rib 26 projects into a groove 28 provided on the bore 16a of the inner ring. The groove 28 is directed radially outwards and is formed on the bore 16a. Each part ring 20, 22, 24 comprises a segment of the groove 28. In the illustrated example, the rib 26 is located in a radial plan passing through the centre of the inner ring 16.

The outer diameter of the rib 26 is greater than the diameter of the bore 16a of the inner ring so that a diametral interference exists between the sleeve 18 and the inner ring 16. This surely prevents an axial displacement of the sleeve 18 relative to the inner ring 16. The annular rib 26 forms an axial retaining means cooperating with a complementary retention means of the inner ring 16. The sleeve 18 is locked in axial direction with regard to the inner ring 16 without additional means. The rib 26 engages into the groove 28 with frictional contact.

Figure 2:
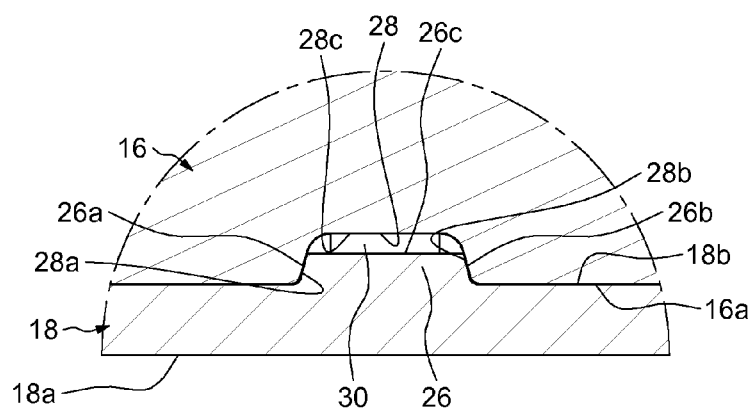
FIG. 2 is a detail view of FIG. 1.

As shown more clearly on FIG. 2, the rib 26 of the sleeve comprises frontal sloped surfaces 26a, 26b engaging with corresponding sloped sidewalls 28a, 28b of the groove, and an outer surface 26c extending axially between the surfaces 26a, 26b. The rib 26 interferes with the two opposed sidewalls 28a, 28b of the groove. A radial gap 30 exists between the outer surface 26c of the rib and a bottom 28c of the groove which is extended radially by the sidewalls 28a, 28b.

In the illustrated example, the rib 26 and the sleeve 18 are formed in one part. Alternatively, the rib 26 and the sleeve 18 may be two separate parts which are assembled together. Here, the rib 26 has an annular form. Alternatively, the sleeve may comprise a plurality of ribs spaced apart one to another in the circumferential direction.

In the illustrated example, the part rings 20 to 24 are identical one to another. In case of the mounting of the three part rings of the same size is not possible due to collision between the outer ring 14 and the last part ring to be mounted, the bearing may comprise a part ring having a reduced length in the circumferential direction with regard to the other part rings.

Alternatively or in combination, one of the part rings of the inner ring may comprise chamfers 24a formed at least at one end of its inner surface as shown in the second example illustrated on FIG. 6, in which identical parts are given identical references. With such chamfers, the part ring 24 can be slightly inclined and pushed deeper when mounted inside the outer ring 14.

Although the invention has been illustrated on the basis of a radial spherical plain bearing having an inner sleeve provided with a protrusion extending into a groove formed on the bore of the inner ring, it should be understood that the invention can be applied with an inverted arrangement, i.e. a protrusion provided on the bore of the inner ring and engaging into a groove formed on the outer surface of the sleeve. In another embodiment, it could also be possible to combine these two arrangements. In the disclosed embodiments, the inner ring comprises three part rings. Alternatively, it could be possible to foresee an inner having four part rings or more.

The invention claimed is:

1. A spherical plain bearing comprising:
   an inner ring provided with a spherical outer surface and with lateral surfaces;
   an outer ring provided with a corresponding spherical inner surface mounted on the outer surface, and a sleeve mounted into a bore of the inner ring;
   the inner ring comprising at least three part rings which are mounted in contact in the circumferential direction one relative to another;
   at least one protrusion being provided on at least one of:
      (a) an outer surface of a sleeve and extending into a groove formed on the bore of the inner ring, and
      (b) the bore and extending into a groove formed on the outer surface, and
   a radial gap provided between the protrusion and a bottom of the associated groove,
   wherein the sleeve leaves the lateral surfaces free of the inner ring.

2. The spherical plain bearing according to claim 1, wherein the protrusion extends radially.

3. The spherical plain bearing according to claim 1, wherein the protrusion comprises sloped frontal surfaces engaging with corresponding sloped sidewalls of the associated groove.

4. The spherical plain bearing according to claim 1, comprising only one protrusion.

5. The spherical plain bearing according to claim 4, wherein the one protrusion is located in a radial plane passing through the center of the inner ring.

6. The spherical plain bearing according to claim 1, wherein at least one part ring of the inner ring comprises chamfers formed about at least at one end of its bore.

7. The spherical plain bearing according to claim 1, wherein the part rings of the inner ring are identical one to another.

8. The spherical plain bearing according to claim 1, wherein at least one of the part rings of the inner ring has a reduced length in the circumferential direction with regard to the other part rings.

9. The spherical plain bearing according to claim 1, the spherical plain bearing being manufactured in accordance with at least one of the following:
   the inner ring being made from a material having a density smaller than the one of the material of the sleeve,
   the sleeve being made from bronze, and
   the inner ring being made from titanium.

10. The spherical plain bearing according to claim 1, wherein at least one of the inner and outer surfaces of the rings is coated with at least one of an antifriction and a wear resistance coating.

11. A spherical plain bearing comprising:
an inner ring provided with a spherical outer surface and with lateral surfaces;
an outer ring provided with a corresponding spherical inner surface mounted on the outer surface, and a sleeve mounted into a bore of the inner ring;
the inner ring comprising at least three part rings which are mounted in contact in the circumferential direction one relative to another;
at least one protrusion being provided on at least one of:
(a) an outer surface of a sleeve and extending into a groove formed on the bore of the inner ring, and
(b) the bore and extending into a groove formed on the outer surface, and
wherein at least one part ring of the inner ring comprises chamfers formed about at least at one end of its bore,
wherein the sleeve leaves the lateral surfaces free of the inner ring.

12. The spherical plain bearing according to claim 11, wherein the protrusion extends radially.

13. The spherical plain bearing according to claim 11, wherein the protrusion comprises sloped frontal surfaces engaging with corresponding sloped sidewalls of the associated groove.

14. The spherical plain bearing according to claim 11, comprising only one protrusion.

15. The spherical plain bearing according to claim 14, wherein the one protrusion is located in a radial plane passing through the center of the inner ring.

16. The spherical plain bearing according to claim 11, the spherical plain bearing being manufactured in accordance with at least one of the following:
wherein the inner ring is made from a material having a density smaller than the one of the material of the sleeve,
wherein the sleeve is made from bronze,
wherein the inner ring is made from titanium and
wherein at least one of the inner and outer surfaces of the rings is coated with at least one of an antifriction and a wear resistance coating.

17. A spherical plain bearing comprising:
an inner ring provided with a spherical outer surface and with lateral surfaces;
an outer ring provided with a corresponding spherical inner surface mounted on the outer surface, and a sleeve mounted into a bore of the inner ring;
the inner ring comprising at least three part rings which are mounted in contact in the circumferential direction one relative to another;
at least one protrusion being provided on at least one of:
(a) an outer surface of a sleeve and extending into a groove formed on the bore of the inner ring, and
(b) the bore and extending into a groove formed on the outer surface, and
wherein at least one of the part rings of the inner ring has a reduced length in the circumferential direction with regard to the other part rings,
wherein the sleeve leaves the lateral surfaces free of the inner ring.

18. The spherical plain bearing according to claim 17, wherein the protrusion comprises sloped frontal surfaces engaging with corresponding sloped sidewalls of the associated groove.

19. The spherical plain bearing according to claim 17, comprising only one protrusion.

20. The spherical plain bearing according to claim 17, the spherical plain bearing being manufactured in accordance with at least one of the following:
wherein the inner ring is made from a material having a density smaller than the one of the material of the sleeve,
wherein the sleeve is made from bronze,
wherein the inner ring is made from titanium and
wherein at least one of the inner and outer surfaces of the rings is coated with at least one of an antifriction and a wear resistance coating.

* * * * *